US008565085B2

(12) United States Patent
Kotrla et al.

(10) Patent No.: US 8,565,085 B2
(45) Date of Patent: Oct. 22, 2013

(54) LINK AGGREGATION

(75) Inventors: Scott R. Kotrla, Wylie, TX (US);
Howard H. Chiu, Plano, TX (US);
Donald Pitchforth, Jr., Rockwall, TX (US); Michael U. Bencheck, Richardson, TX (US); Richard C. Schell, Allen, TX (US); Matthew W. Turlington, Richardson, TX (US);
Glenn Wellbrock, Wylie, TX (US);
James D. Lee, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 477 days.

(21) Appl. No.: 11/550,015

(22) Filed: Oct. 17, 2006

(65) Prior Publication Data
US 2008/0089326 A1 Apr. 17, 2008

(51) Int. Cl.
*H04L 12/26* (2006.01)

(52) U.S. Cl.
USPC ............................ 370/232; 370/254; 370/419

(58) Field of Classification Search
USPC ......... 370/216–228, 389, 401, 232, 254, 391, 370/392, 419
See application file for complete search history.

(56) References Cited

U.S. PATENT DOCUMENTS

| 5,809,021 A | 9/1998 | Diaz et al. |
| 5,959,968 A * | 9/1999 | Chin et al. ..................... 370/216 |
| 6,501,749 B1 * | 12/2002 | Alexander et al. ............ 370/351 |
| 6,621,790 B1 * | 9/2003 | Wils et al. ..................... 370/226 |
| 6,928,478 B1 * | 8/2005 | Gangadharan ................ 709/226 |
| 7,120,834 B1 * | 10/2006 | Bishara ............................ 714/43 |
| 7,190,696 B1 * | 3/2007 | Manur et al. ................... 370/392 |
| 7,414,985 B1 * | 8/2008 | Tedijanto et al. .............. 370/255 |
| 7,613,201 B1 * | 11/2009 | Yang et al. ..................... 370/437 |
| 2003/0128706 A1 * | 7/2003 | Mark et al. .................. 370/395.1 |
| 2005/0163123 A1 | 7/2005 | Gangadharan |
| 2005/0276263 A1 * | 12/2005 | Suetsugu et al. .............. 370/389 |
| 2006/0209774 A1 | 9/2006 | Mori |
| 2006/0251106 A1 * | 11/2006 | Nakagawa et al. ........... 370/456 |
| 2007/0086355 A1 * | 4/2007 | Sawada et al. ................ 370/252 |
| 2007/0195795 A1 * | 8/2007 | Arai et al. ..................... 370/396 |
| 2007/0237172 A1 * | 10/2007 | Zelig et al. .................... 370/465 |
| 2007/0274351 A1 * | 11/2007 | Theodoras .................... 370/537 |
| 2007/0280258 A1 * | 12/2007 | Rajagopalan et al. ..... 370/395.3 |
| 2008/0130659 A1 * | 6/2008 | Polland ..................... 370/395.52 |

FOREIGN PATENT DOCUMENTS

| EP | 0889624 | 1/1999 |
| GB | 2371706 | 7/2002 |

OTHER PUBLICATIONS

Lan Man Standrs. Committee of the IEEE Comp. Society: "Amndt. to Carrier Sense Multiple Access with Collision Detection (CSMA/CD) Access Method and Physical Layer Specifications-Aggregation of Multiple Link segments", IEEE Stand. 802.3AD-2000, Mar. 30, 2000.

* cited by examiner

*Primary Examiner* — Chirag Shah
*Assistant Examiner* — Jenkey Van

(57) ABSTRACT

A disclosed method and device relate to defining a link aggregation group (LAG) media access control (MAC) address and assigning the LAG MAC address to two or more links to define a LAG. The LAG MAC address does not duplicate physical MAC addresses associated with the links in the LAG. Datagrams associated with the links in the LAG are routed based on the LAG MAC address.

17 Claims, 8 Drawing Sheets

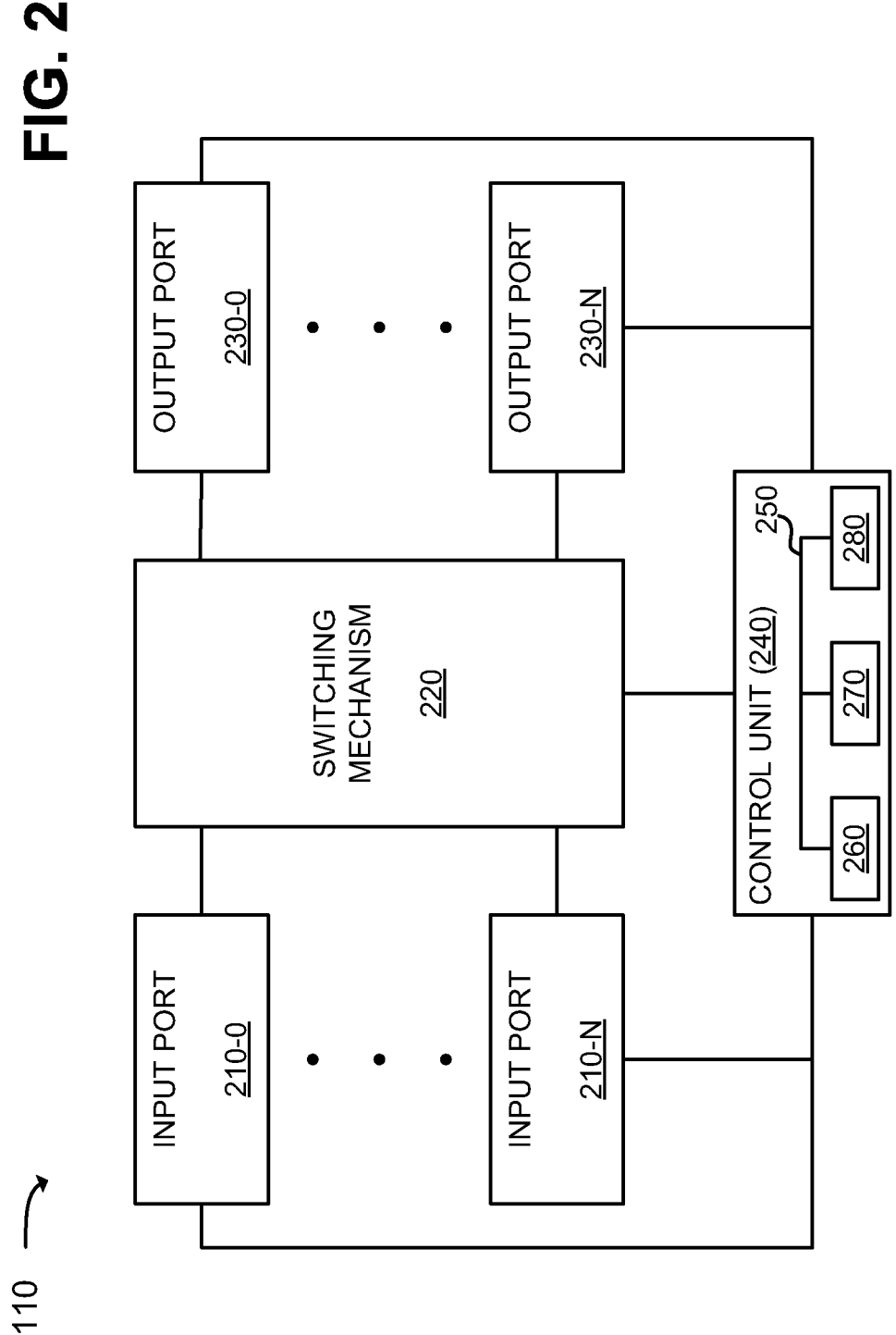

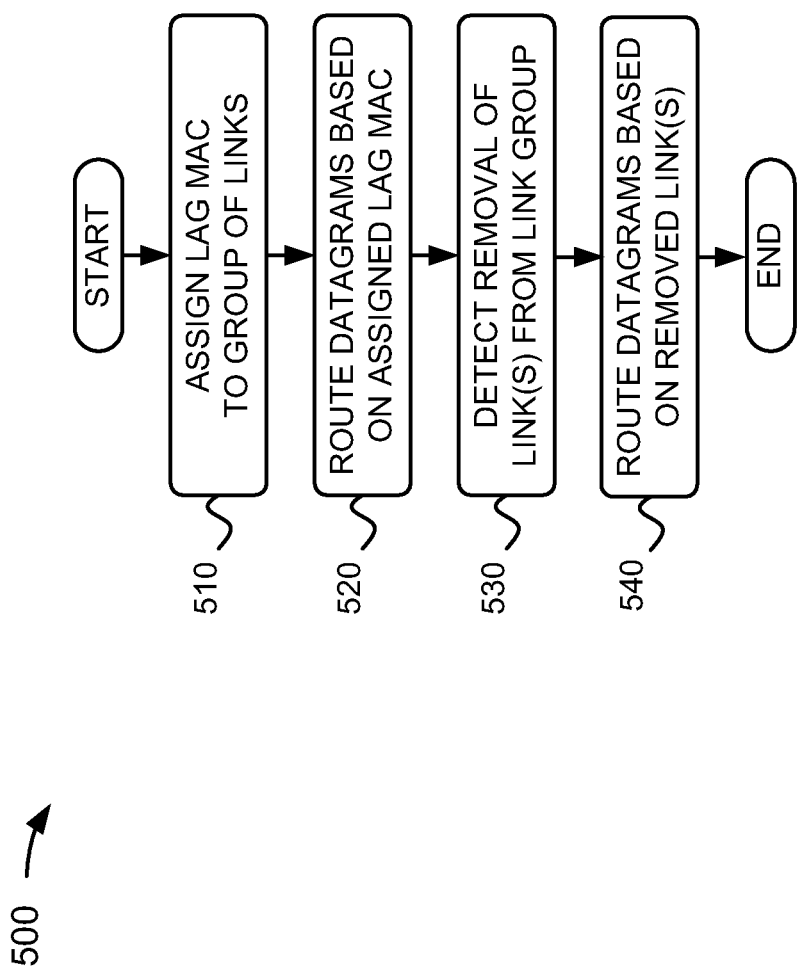

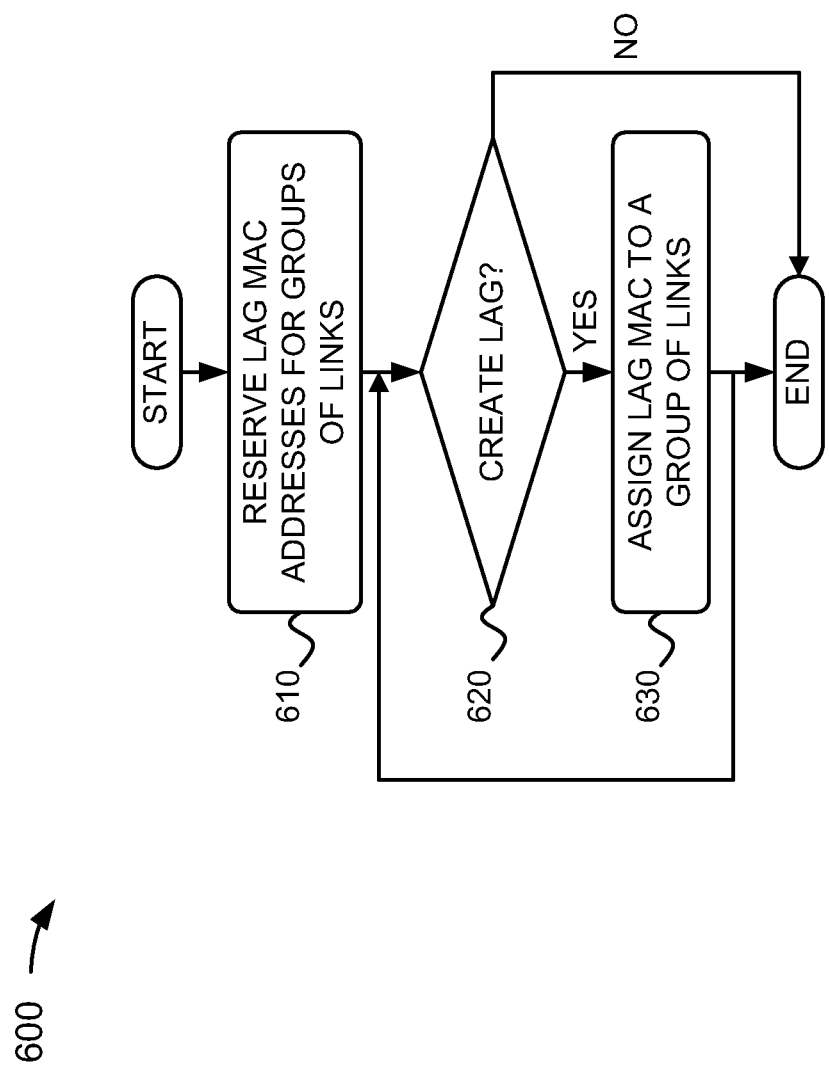

LINK AGGREGATION

BACKGROUND INFORMATION

A link aggregation (e.g., as set forth in IEEE 802.3ad) is a computer networking term which describes using multiple links (e.g., Ethernet network cables and/or ports in parallel) as one logical port to increase the link speed beyond the limits of any one single link. Other terms used for link aggregation may include Ethernet trunking, network interface card (NIC) teaming, port teaming, NIC bonding, and/or link aggregation group (LAG). LAG will be used hereinafter to refer to link aggregation.

LAG is an inexpensive way to set up a high-speed backbone network that may transfer more datagrams than any one single port or device can utilize. A "datagram(s)" may include any type or form of data, such as packet or non-packet data. LAG may permit several devices to communicate simultaneously at their full single-port speed, while not permitting any one single device to monopolize all available backbone capacity. Network datagrams may be dynamically distributed across ports so that administration of what datagrams actually flow across a given port may be taken care of automatically with the LAG.

LAGs also provide reliability. Should one of the multiple ports used in a LAG fail, network traffic (e.g., datagrams) may be dynamically redirected to flow across the remaining good ports in the LAG. The redirection may be triggered when a switch learns that a media access control (MAC) address has been automatically reassigned from one LAG port to another port in the same LAG. The switch may send the datagrams to the new LAG port, and the network may continue to operate with virtually no interruption in service.

A LAG protocol (LAP), such as the LAP set forth in IEEE 802.3ad, allows one or more links to be aggregated together to form a LAG. Once implemented, the LAG can be configured and reconfigured quickly and automatically with a low risk of duplication or rendering of frames.

Each communication interface is typically assigned a unique real MAC (RMAC) address to ensure that all devices in an Ethernet network have distinct addresses. A real MAC address is a hardware or physical address that uniquely identifies each device of a system. A real MAC address may be programmed by the device manufacturer. The communication interfaces (e.g., ports) of a LAG may have the same MAC address so that the LAG may behave as a single virtual link.

Typically, the real MAC address of one member (e.g., a port) of the LAG is chosen as the LAG MAC address for the group. Problems occur when the member whose MAC address is being used as the LAG MAC address wants to leave the LAG. Currently, the entire LAG has to be taken out of service so that the LAG can take on a new LAG MAC address.

BRIEF DESCRIPTION OF THE DRAWINGS

The accompanying drawings, which are incorporated in and constitute a part of this specification, illustrate an embodiment of the invention and, together with the description, explain the invention. In the drawings:

FIG. 2 is a diagram of an exemplary network device of FIG. 1;

FIGS. 5 and 6 are flowcharts of exemplary processes for a network and/or a network device of FIG. 1 according to implementations consistent with principles of the invention.

DETAILED DESCRIPTION OF PREFERRED EMBODIMENTS

The following detailed description of the invention refers to the accompanying drawings. The same reference numbers in different drawings may identify the same or similar elements. Also, the following detailed description does not limit the invention.

Implementations described herein may provide systems and methods that enable creation of a LAG from two or more links via assignment of a unique LAG MAC address to the two or more links. For example, in one implementation, the unique LAG MAC address may be assigned to two or more output ports of a network device to create a LAG from the output ports, without duplicating the physical or real MAC addresses of the output ports contained within the LAG. In another implementation, the unique LAG MAC address may be assigned to a group of input ports of a network device to create a LAG from the input ports, without duplicating the physical or real MAC addresses of the input ports contained within the LAG. Such arrangements may enable a link (e.g., an output or an input port) within the LAG to be removed from the LAG without taking the entire LAG out of service.

Figure 1:
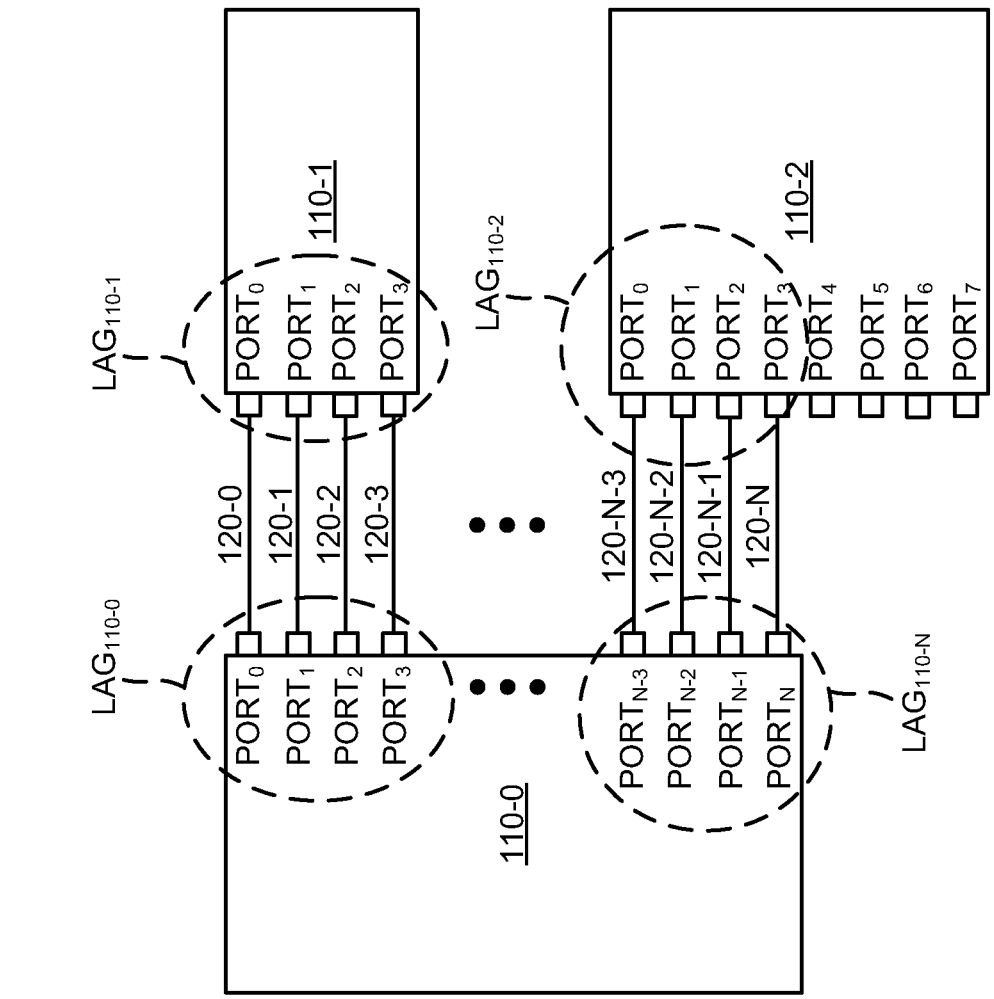
FIG. 1 is a diagram illustrating an exemplary network in which systems and methods consistent with principles of the invention may be implemented.

FIG. 1 is a diagram illustrating an exemplary network 100 in which systems and methods consistent with principles of the invention may be implemented. Network 100 may include, for example, a local area network (LAN), a private network (e.g., a company intranet), a wide area network (WAN), a metropolitan area network (MAN), or another type of network.

As shown in FIG. 1, network 100 may include network devices 110-0, 110-1 and 110-2 (collectively referred to as network devices 110) interconnected by links 120-0, ..., 120-N (collectively referred to as links 120). While three network devices 110 and eight links 120 are shown in FIG. 1, more or fewer network devices 110 and/or links 120 may be used in other implementations consistent with principles of the invention. Network 100 may also include other components, devices, etc. (not shown in FIG. 1).

Network device 110 may include a variety of network devices. For example, network device 110 may include a computer, a router, a switch, a network interface card (NIC), a hub, a bridge, etc. Links 120 may include a path that permits communication among devices 110, such as wired, wireless, and/or optical connections, input ports, output ports, etc. For example, network device 110-0 may include ports $PORT_0$, $PORT_1, \ldots, PORT_N$, network device 110-1 may include ports $PORT_0$, $PORT_1$, $PORT_2$, $PORT_3$, and network device 110-2 may include ports $PORT_0$, $PORT_1, \ldots, PORT_7$. The ports of network devices 110 may be considered part of corresponding links 120 and may be either input ports, output ports, or combinations of input and output ports. While eight ports for network device 110-0, four ports for network device 110-1, and eight ports for network device 110-2 are shown in FIG. 1, more or fewer ports may be used in other implementations consistent with principles of the invention.

In an exemplary implementation, network devices 110 may provide entry and/or exit points for datagrams in network 100. Since Ethernet may be bi-directional, the ports (e.g., $PORT_0, \ldots,$ and $PORT_N$) of network device 110-0 may send and/or receive datagrams. The ports (e.g., $PORT_0$, $PORT_1$, $PORT_2$, and $PORT_3$) of network device 110-1 and the ports (e.g., $PORT_0, \ldots,$ and $PORT_7$) of network device 110-2 may likewise send and/or receive datagrams.

A LAG may be established between network devices 110-0 and 110-1. For example, ports $PORT_0, \ldots,$ and $PORT_3$ of network device 110-0 may be grouped together into a $LAG_{110-0}$ that may communicate bi-directionally with ports $PORT_0$, $PORT_1$, $PORT_2$, and $PORT_3$ of network device 110-1, via links 120-0, 120-1, 120-2, and 120-3. Ports $PORT_0$, $PORT_1$, $PORT_2$, and $PORT_3$ of network device 110-1 may be grouped together into a $LAG_{110-1}$. $LAG_{110-0}$ and $LAG_{110-1}$ may permit ports $PORT_0$, $PORT_1$, $PORT_2$, and $PORT_3$ of network device 110-0 and ports $PORT_0$, $PORT_1$, $PORT_2$, and $PORT_3$ of network device 110-1 to communicate bi-directionally. Datagrams may be dynamically distributed between ports (e.g., $PORT_0$, $PORT_1$, $PORT_2$, and $PORT_3$) of network device 110-0 and ports (e.g., $PORT_0$, $PORT_1$, $PORT_2$, and $PORT_3$) of network device 110-1 so that administration of what datagrams actually flow across a given link (e.g., links 120-0, ..., and 120-3) may be automatically handled by $LAG_{110-0}$ and $LAG_{110-1}$.

In another implementation, a LAG may be established between network devices 110-0 and 110-2. For example, ports $PORT_{N-3}, \ldots,$ and $PORT_N$ of network device 110-0 may be grouped together into a $LAG_{110-N}$ that may communicate bi-directionally with ports $PORT_0$, $PORT_1$, $PORT_2$, and $PORT_3$ of network device 110-2, via links 120-N-3, 120-N-2, 120-N-1, and 120-N. Ports $PORT_0$, $PORT_1$, $PORT_2$, and $PORT_3$ of network device 110-2 may be grouped together into a $LAG_{110-2}$. $LAG_{110-N}$ and $LAG_{110-2}$ may permit ports $PORT_{N-3}, \ldots,$ and $PORT_N$ of network device 110-0 and ports $PORT_0$, $PORT_1$, $PORT_2$, and $PORT_3$ of network device 110-2 to communicate bi-directionally. Datagrams may be dynamically distributed between ports (e.g., $PORT_{N-3}, \ldots,$ and $PORT_N$) of network device 110-0 and ports (e.g., $PORT_0$, $PORT_1$, $PORT_2$, and $PORT_3$) of network device 110-2 so that administration of what datagrams actually flow across a given link (e.g., links 120-N-3, ..., and 120-N) may be automatically handled by $LAG_{110-N}$ and $LAG_{110-2}$. With such an arrangement, network devices 110 may transmit and receive datagrams simultaneously on all links within a LAG established by network devices 110.

Every port in network devices 110 may be associated with a real MAC address. Datagrams originating from a port may include the real MAC address of the port in a source MAC address field, and datagrams sent to a port may include the real MAC address of the port in a destination MAC address field. Under the seven layer OSI reference model, the LAG layer may be a sub-layer of the data link layer and may be located above the MAC sub-layer. The LAG layer may replace the MAC addresses of a port in a LAG with a LAG MAC address. For example, $LAG_{110-0}$ may replace the MAC addresses of ports $PORT_0, \ldots, PORT_3$ with a LAG MAC address. Thus, datagrams exiting a port of a LAG may have the LAG MAC address in a source address field of the Ethernet frame, and datagrams entering a port of a LAG may have the LAG MAC address in a destination address field.

Conventionally, the real MAC address of one port (e.g., $PORT_0$) of the LAG is chosen as the LAG MAC address for the LAG, which creates problems when the port whose MAC address is being used by the LAG wants to leave the LAG, as described above. In implementations described herein, a unique LAG MAC address may be assigned to two or more links (e.g., ports) to create a LAG. For example, the unique LAG MAC address may be assigned to two or more ports of a network device to create a LAG from the ports, without duplicating the physical or real MAC addresses of the ports contained within the LAG.

FIG. 2 is an exemplary diagram of a device that may correspond to one of network devices 110 of FIG. 1. The device may include input ports 210, a switching mechanism 220, output ports 230, and a control unit 240. Input ports 210 may be the point of attachment for a physical link (e.g., link 120) (not shown) and may be the point of entry for incoming datagrams. Switching mechanism 220 may interconnect input ports 210 with output ports 230. Output ports 230 may store datagrams and may schedule datagrams for service on an output link (e.g., link 120) (not shown). Control unit 240 may use routing protocols and one or more forwarding tables for forwarding datagrams.

Input ports 210 may carry out data link layer encapsulation and decapsulation. Input ports 210 may look up a destination address of an incoming datagram in a forwarding table to determine its destination port (i.e., route lookup). In order to provide quality of service (QoS) guarantees, input ports 210 may classify datagrams into predefined service classes. Input ports 210 may run data link-level protocols or network-level protocols. In other implementations, input ports 210 may send (e.g., may be an exit point) and/or receive (e.g., may be an entry point) datagrams.

Switching mechanism 220 may be implemented using many different techniques. For example, switching mechanism 220 may include busses, crossbars, and/or shared memories. The simplest switching mechanism 220 may be a bus that links input ports 210 and output ports 230. A crossbar may provide multiple simultaneous data paths through switching mechanism 220. In a shared-memory switching mechanism 220, incoming datagrams may be stored in a shared memory and pointers to datagrams may be switched.

Output ports 230 may store datagrams before they are transmitted on an output link (e.g., link 120). Output ports 230 may include scheduling algorithms that support priorities and guarantees. Output ports 230 may support data link layer encapsulation and decapsulation, and/or a variety of higher-level protocols. In other implementations, output ports 230 may send (e.g., may be an exit point) and/or receive (e.g., may be an entry point) datagrams.

Control unit 240 may interconnect with input ports 210, switching mechanism 220, and output ports 230. Control unit 240 may compute a forwarding table, implement routing protocols, and/or run software to configure and manage network device 110. Control unit 240 may handle any datagram whose destination address may not be found in the forwarding table.

In one implementation, control unit 240 may include a bus 250 that may include a path that permits communication among a processor 260, a memory 270, and a communication interface 280. Processor 260 may include a microprocessor or processing logic that may interpret and execute instructions. Memory 270 may include a random access memory (RAM), a read only memory (ROM) device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110, consistent with principles of the invention, may perform certain operations, as described in detail below. Network device 110 may perform these operations in response to processor 260 executing software instructions contained in a computer-readable medium, such as memory 270. A computer-readable medium may be defined as a physical or logical memory device and/or carrier wave.

The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Figure 3A:
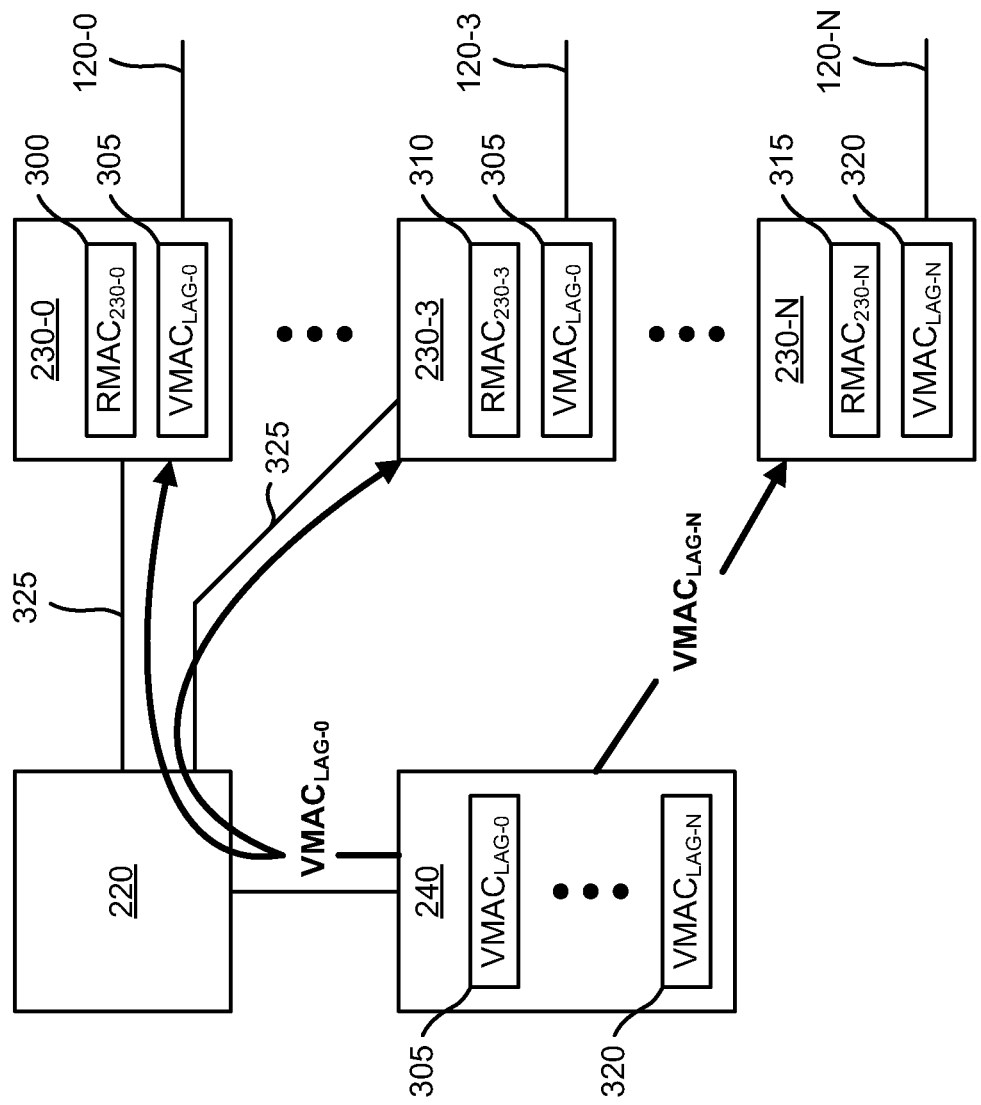
FIG. 3A is a diagram showing creation of LAGs with output ports of the network device of FIG. 2.
Figure 3B:
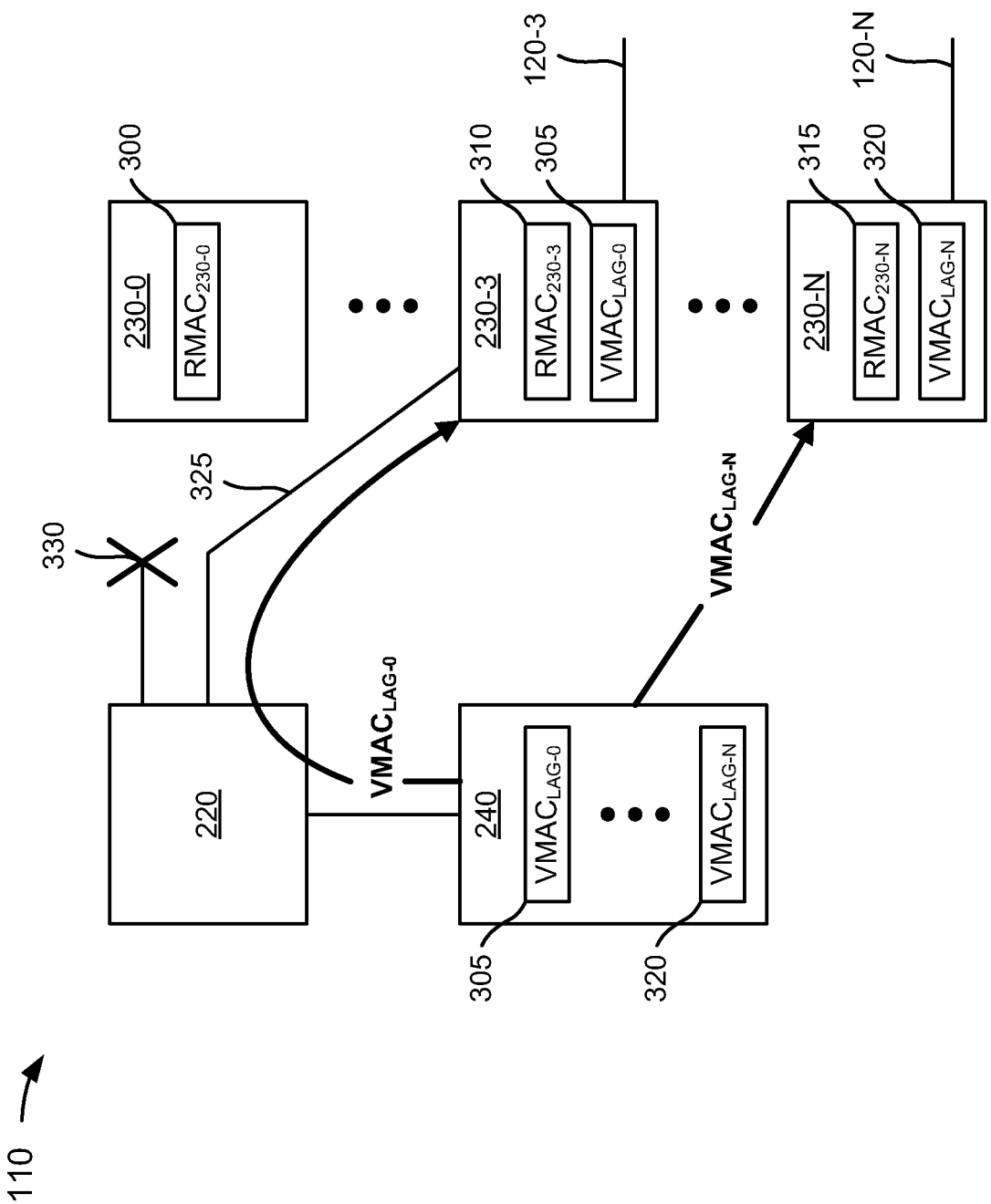
FIG. 3B is a diagram showing removal of an output port from one of the LAGs shown in FIG. 3A.
Figure 4A:
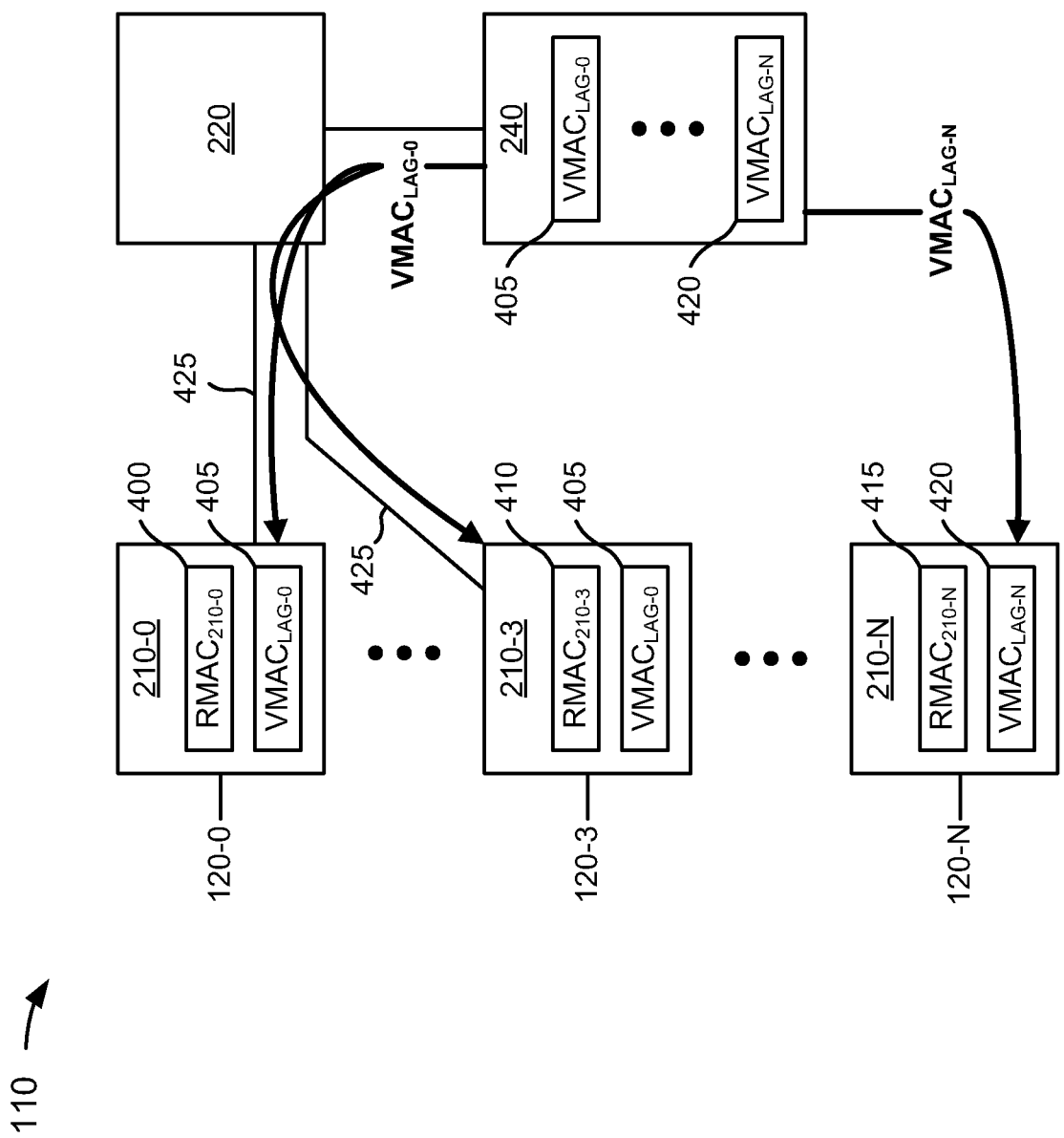
FIG. 4A is a diagram showing creation of LAGs with input ports of the network device of FIG. 2.
Figure 4B:
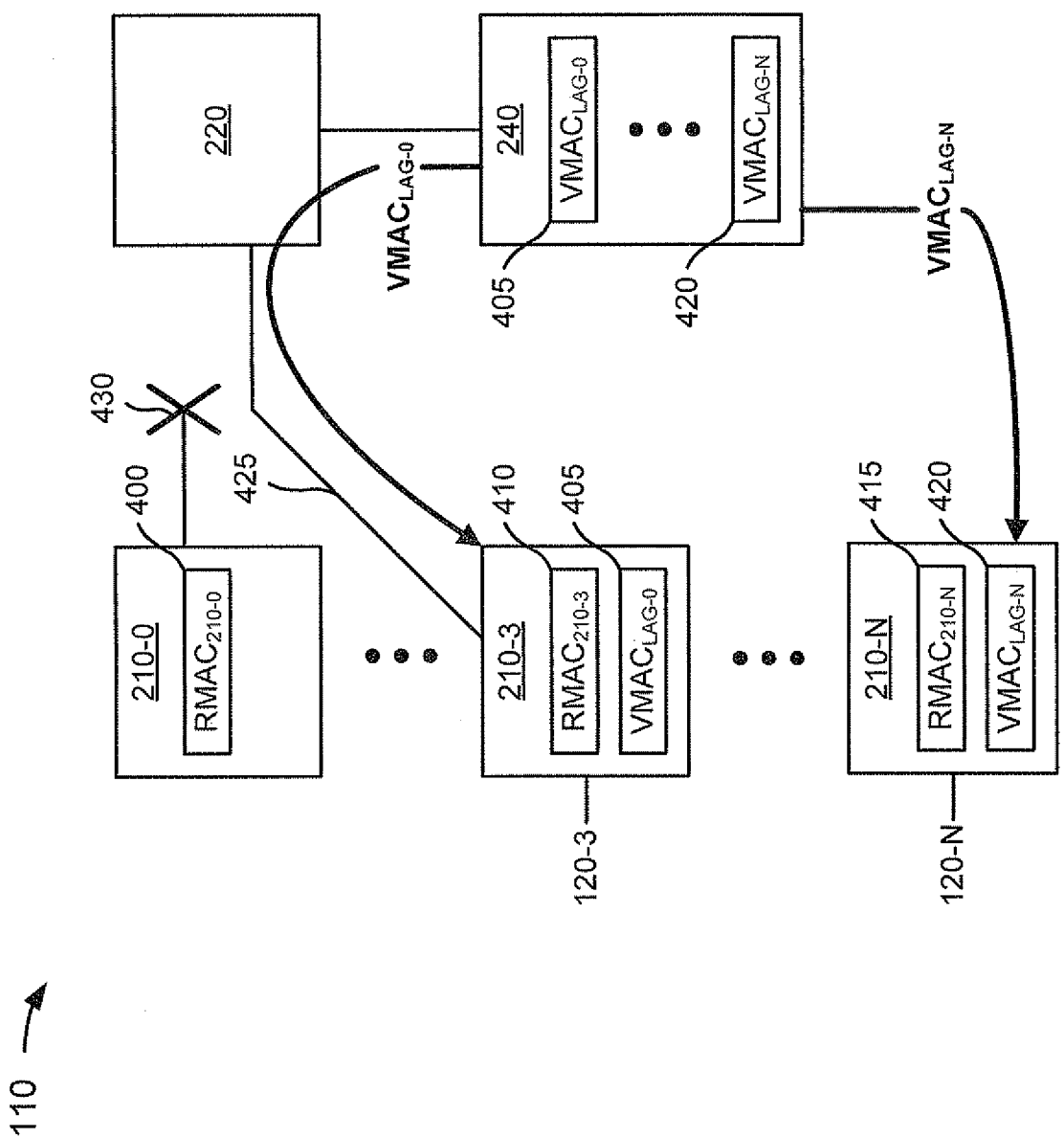
FIG. 4B is a diagram showing removal of an input port from one of the LAGs shown in FIG. 4A.

LAGs may be created with two or more ports (e.g., input ports 210 or output ports 230) of network device 110 with LAG MAC addressing. FIGS. 3A and 3B show exemplary LAG MAC addressing for output ports of a device (e.g., network device 110). FIGS. 4A and 4B show exemplary LAG MAC addressing for input ports of a device (e.g., network device 110).

FIG. 3A is a diagram showing creation of LAGs with output ports of network device 110 of FIG. 2. As shown in FIG. 3A, network device 110 may include switching mechanism 220, output ports (e.g., output ports 230-0, 230-3, and 230-N), and control unit 240. Output port 230-0 may have a real MAC address ($RMAC_{230-0}$) 300 and a LAG MAC address ($VMAC_{LAG-0}$) 305 associated with it. LAG MAC address 305 may be used to send information to a proper location, and may be a virtual MAC address associated with and/or used by whichever ports of network device 110 that may be within the LAG. Output port 230-0 may be associated with a link (e.g., link 120-0) for transmission of datagrams.

Output port 230-3 may have real MAC address ($RMAC_{230-3}$) 310 and LAG MAC address ($VMAC_{LAG-0}$) 305 associated with it. Output port 230-3 may be associated with a link (e.g., link 120-3) for transmission of datagrams.

Output port 230-N may have a real MAC address ($RMAC_{230-N}$) 315 and a LAG MAC address ($VMAC_{LAG-N}$) 320 associated with it. LAG MAC address 320 may be used to send information to a proper location, and may be a virtual MAC address associated with and/or used by whichever ports of network device 110 that may be within the LAG. Output port 230-N may be associated with a link (e.g., link 120-N) for transmission of datagrams.

Control unit 240 of network device 110 may reserve LAG MAC addresses (e.g., $VMAC_{LAG-0}$, . . . , $VMAC_{LAG-N}$) 305, 320 for use when defining LAGs from two or more links (e.g., output ports 230). For example, reserved LAG MAC addresses 305, 320 may be stored in memory 270 of control unit 240. Reserved LAG MAC addresses 305, 320 may be distinct from the real or physical MAC addresses of the links (e.g., output ports 230) defined by a LAG. In one implementation, LAG MAC address ($VMAC_{LAG-0}$) 305 may be assigned by control unit 240 to two or more output ports (e.g., output ports 230-0 and 230-3) to define a LAG (e.g., $LAG_{110-0}$ in FIG. 1). Datagrams 325 may be received from switching mechanism 220 and may be transmitted by output ports within the defined LAG (e.g., output ports 230-0 and 230-3). Network device 110 may transmit datagrams 325 simultaneously on all links (e.g., output ports 230-0 and 230-3) within the LAG established by network device 110 (e.g., $LAG_{110-0}$).

In another implementation, LAG MAC address ($VMAC_{LAG-N}$) 320 may be assigned by control unit 240 to two or more output ports (e.g., output port 230-N and at least another output port (not shown)) to define a LAG (e.g., $LAG_{110-N}$ in FIG. 1). Datagrams may be received from switching mechanism 220 and may be transmitted by output ports within the defined LAG (e.g., output port 230-N and another output port). Network device 110 may transmit datagrams simultaneously on all links (e.g., output port 230-N and another output port) within the LAG established by network device 110 (e.g., $LAG_{110-N}$).

FIG. 3B is a diagram showing removal of an output port from one of the LAGs shown in FIG. 3A. As shown in FIG. 3B, network device 110 may include switching mechanism 220, output ports (e.g., output ports 230-0, 230-3, and 230-N), control unit 240, and the component interrelations described above in connection with FIG. 3A. However, output port 230-0 may wish to leave its defined LAG (e.g., $LAG_{110-0}$), and thus, may no longer have LAG MAC address ($VMAC_{LAG-0}$) 305 associated with it. Control unit 240 may detect removal of output port 230-0 from the defined LAG, and may remove LAG MAC address 305 from output port 230-0, as illustrated in FIG. 3B. Datagrams associated with the defined LAG (e.g., $LAG_{110-0}$) may no longer be transmitted to and/or by output port 230-0 (as shown by reference number 330), but may be transmitted to and/or by other output ports (e.g., output port 230-3) associated with the defined LAG (as shown by reference number 325).

FIG. 4A is a diagram showing creation of LAGs with input ports of network device 110 of FIG. 2. As shown in FIG. 4A, network device 110 may include input ports (e.g., input ports 210-0, 210-3, and 210-N), switching mechanism 220, and control unit 240. Input port 210-0 may have a real MAC address ($RMAC_{210-0}$) 400 and a LAG MAC address ($VMAC_{LAG-0}$) 405 associated with it. LAG MAC address 405 may be used to send information to a proper location, and may be a virtual MAC address associated with and/or used by whichever ports of network device 110 that may be within the LAG. Input port 210-0 may be associated with a link (e.g., link 120-0) for receipt of datagrams.

Input port 210-3 may have real MAC address ($RMAC_{210-3}$) 410 and LAG MAC address ($VMAC_{LAG-0}$) 405 associated with it. Input port 210-3 may be associated with a link (e.g., link 120-3) for receipt of datagrams.

Input port 210-N may have a real MAC address ($RMAC_{210-N}$) 415 and a LAG MAC address ($VMAC_{LAG-N}$) 420 associated with it. LAG MAC address 420 may be used to send information to a proper location, and may be a virtual MAC address associated with and/or used by whichever ports of network device 110 that may be within the LAG. Input port 210-N may be associated with a link (e.g., link 120-N) for receipt of datagrams.

Control unit 240 of network device 110 may reserve LAG MAC addresses (e.g., $VMAC_{LAG-0}$, . . . , $VMAC_{LAG-N}$) 405, 420 for use when defining LAGs from two or more links (e.g., input ports 210). For example, reserved LAG MAC addresses 405, 420 may be stored in memory 270 of control unit 240. Reserved LAG MAC addresses 405, 420 may be distinct from the real or physical MAC addresses of the links (e.g., input ports 210) defined by a LAG. For example, in one implementation, LAG MAC address ($VMAC_{LAG-0}$) 405 may be assigned by control unit 240 to two or more input ports (e.g., input ports 210-0 and 210-3) to define a LAG (e.g., $LAG_{110-0}$ in FIG. 1). Datagrams 425 may be received by input ports within the defined LAG (e.g., input ports 210-0 and 210-3) and may be provided to switching mechanism 220. Network device 110 may receive datagrams 425 simultaneously on all links (e.g., input ports 210-0 and 210-3) within the LAG established by network device 110 (e.g., $LAG_{110-0}$).

In another implementation, LAG MAC address (VMAC$_{LAG-N}$) 420 may be assigned by control unit 240 to two or more input ports (e.g., input port 210-N and at least another input port (not shown)) to define a LAG (e.g., LAG$_{110-N}$ in FIG. 1). Datagrams may be received by input ports within the defined LAG (e.g., input port 210-N and another output port) and may be provided to switching mechanism 220. Network device 110 may receive datagrams simultaneously on all links (e.g., input port 210-N and another input port) within the LAG established by network device 110 (e.g., LAG$_{110-N}$).

FIG. 4B is a diagram showing removal of an input port from one of the LAGs shown in FIG. 4A. As shown in FIG. 4B, network device 110 may include switching mechanism 220, input ports (e.g., input ports 210-0, 210-3, and 210-N), control unit 240, and the component interrelations described above in connection with FIG. 4A. However, input port 210-0 may wish to leave its defined LAG (e.g., LAG$_{110-0}$), and thus, may no longer have LAG MAC address (VMAC$_{LAG-0}$) 405 associated with it. Control unit 240 may detect removal of input port 210-0 from the defined LAG, and may remove LAG MAC address 405 from input port 210-0, as illustrated in FIG. 4B. Datagrams associated with the defined LAG (e.g., LAG$_{110-0}$) may no longer be received by input port 210-0 (as shown by reference number 430), but may be received by other input ports (e.g., input port 210-3) associated with the defined LAG (as shown by reference number 425).

FIGS. 5 and 6 are flowcharts of exemplary processes for a network (e.g., network 100) and/or a network device (e.g., network device 110). The processes of FIGS. 5 and 6 may be performed by a device of a network or may be performed by a device external to the network but communicating with the network. The processes may be located within network device 110 of FIG. 2 (e.g., within control unit 240) and/or may be accessible by network device 110.

As shown in FIG. 5, a process 500 may assign a LAG MAC address to a group (e.g., two or more) of links (e.g., ports) (block 510). For example, in one implementation described above in connection with FIG. 3A, LAG MAC address (VMAC$_{LAG-0}$) 305 may be assigned by control unit 240 to two or more output ports (e.g., output ports 230-0 and 230-3) to define a LAG (e.g., LAG$_{110-0}$ in FIG. 1). LAG MAC address 305 may be associated with output ports 230-0 and 230-3, e.g., via storage of LAG MAC address 305 at the appropriate output ports. In another implementation described above in connection with FIG. 4A, LAG MAC address (VMAC$_{LAG-0}$) 405 may be assigned by control unit 240 to two or more input ports (e.g., input ports 210-0 and 210-3) to define a LAG (e.g., LAG$_{110-0}$ in FIG. 1). LAG MAC address 405 may be associated with input ports 210-0 and 210-3, e.g., via storage of LAG MAC address 405 at the appropriate input ports.

Process 500 may route datagrams, via a LAG, based on the assigned LAG MAC address (block 520). For example, in one implementation described above in connection with FIG. 3A, datagrams 325 may be received from switching mechanism 220 and may be transmitted by output ports within the defined LAG (e.g., output ports 230-0 and 230-3). Network device 110 may transmit datagrams 325 simultaneously on all links (e.g., output ports 230-0 and 230-3) within the LAG established by network device 110 (e.g., LAG$_{110-0}$). In another implementation described above in connection with FIG. 4A, datagrams 425 may be received by input ports within the defined LAG (e.g., input ports 210-0 and 210-3) and may be provided to switching mechanism 220. Network device 110 may receive datagrams 425 simultaneously on all links (e.g., input ports 210-0 and 210-3) within the LAG established by network device 110 (e.g., LAG$_{110-0}$).

As further shown in FIG. 5, process 500 may detect removal of a link(s) from the group of links in the LAG (block 530). For example, in one implementation described above in connection with FIG. 3B, output port 230-0 may wish to leave its defined LAG (e.g., LAG$_{110-0}$), and thus, may no longer have LAG MAC address (VMAC$_{LAG-0}$) 305 associated with it. Control unit 240 may detect removal of output port 230-0 from the defined LAG, and may remove LAG MAC address 305 from output port 230-0. In another implementation described above in connection with FIG. 4B, input port 210-0 may wish to leave its defined LAG (e.g., LAG$_{110-0}$), and thus, may no longer have LAG MAC address (VMAC$_{LAG-0}$) 405 associated with it. Control unit 240 may detect removal of input port 210-0 from the defined LAG, and may remove LAG MAC address 405 from input port 210-0.

Process 500 may route datagrams based on the LAG MAC address and based on removal of the link(s) from the group of links in the LAG (block 540). For example, in one implementation described above in connection with FIG. 3B, datagrams associated with the defined LAG (e.g., LAG$_{110-0}$) may no longer be transmitted to and/or by output port 230-0 (as shown by reference number 330), but may be transmitted to and/or by other output ports (e.g., output port 230-3) associated with the defined LAG (as shown by reference number 325). In another implementation described above in connection with FIG. 4B, datagrams associated with the defined LAG (e.g., LAG$_{110-0}$) may no longer be received by input port 210-0 (as shown by reference number 430), but may be received by other input ports (e.g., input port 210-3) associated with the defined LAG (as shown by reference number 425).

As shown in FIG. 6, a process 600 may reserve LAG MAC addresses for groups (e.g., two or more) of links (e.g., ports) (block 610). For example in one implementation described above in connection with FIG. 3A, control unit 240 of network device 110 may reserve LAG MAC addresses (e.g., VMAC$_{LAG-0}$, . . . , VMAC$_{LAG-N}$) 305, 320 for use when defining LAGs from two or more links (e.g., output ports 230). Reserved LAG MAC addresses 305, 320 may be stored in memory 270 of control unit 240, and may be distinct from the real or physical MAC addresses of the links defined by a LAG. In another implementation described above in connection with FIG. 4A, control unit 240 of network device 110 may reserve LAG MAC addresses (e.g., VMAC$_{LAG-0}$, . . . , VMAC$_{LAG-N}$) 405, 420 for use when defining LAGs from two or more links (e.g., input ports 210). LAG MAC addresses 405, 420 may be stored in memory 270 of control unit 240, and may be distinct from the real or physical MAC addresses of the links (e.g., input ports 210) defined by a LAG.

As further shown in FIG. 6, process 600 may determine whether a LAG is to be created (block 620). For example, datagram traffic may be monitored, and, based on a detected pattern, a LAG may be determined to be needed. In another example, QoS may indicate that a larger bandwidth may be required, and a LAG may be set up to accommodate the larger bandwidth. If a LAG is to be created (block 620—YES), then process 600 may assign one of the reserved LAG MAC addresses to a group (e.g., two or more) of links (e.g., ports) (block 630). If a LAG is not to be created (block 620—NO), then process 600 may end. For example, in one implementation described above in connection with FIG. 3A, LAG MAC address (VMAC$_{LAG-0}$) 305 may be assigned by control unit 240 to two or more output ports (e.g., output ports 230-0 and 230-3) to define a LAG (e.g., LAG$_{110-0}$ in FIG. 1). LAG MAC address 305 may be associated with output ports 230-0 and 230-3. In another implementation described above in connection with FIG. 4A, LAG MAC address (VMAC$_{LAG-0}$) 405 may be provided by control unit 240 to two or more input ports (e.g., input ports 210-0 and 210-3) to define a LAG (e.g., $LAG_{110\text{-}0}$ in FIG. 1). LAG MAC address 405 may be associated with input ports 210-0 and 210-3.

Process 600 may repeat block 620 to determine if additional LAGs are to be created. For example, in one implementation described above in connection with FIG. 3A, LAG MAC address ($VMAC_{LAG\text{-}N}$) 320 may be provided by control unit 240 to two or more output ports (e.g., output port 230-N and at least another output port (not shown)) to define a LAG (e.g., $LAG_{110\text{-}N}$ in FIG. 1). LAG MAC address 320 may be associated with output port 230-N and another output port. In another implementation described above in connection with FIG. 4A, LAG MAC address ($VMAC_{LAG\text{-}N}$) 420 may be provided by control unit 240 to two or more input ports (e.g., input port 210-N and at least another input port (not shown)) to define a LAG (e.g., $LAG_{110\text{-}N}$ in FIG. 1). LAG MAC address 420 may be associated with input port 210-N and another input port.

Systems and methods described herein may enable creation of a LAG from two or more links via assignment of a unique LAG MAC address to the two or more links. For example, in one implementation, the unique LAG MAC address may be assigned to two or more ports of a network device to create a LAG from the ports, without duplicating the physical or real MAC addresses of the ports contained within the LAG. Such arrangements may enable a link (e.g., a port) within the LAG to be removed from the LAG without taking the entire LAG out of service.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to the flowcharts of FIGS. 5 and 6, the order of the acts may differ in other implementations consistent with principles of the invention. Further, non-dependent acts may be performed in parallel.

In another example, although FIGS. 3A-4B show LAG MAC addresses being reserved by control unit 240 of network device 110, in other implementations LAG MAC addresses may be reserved by other components of network device 110, such as, e.g., switching mechanism 220.

Aspects of the invention, as described above, may be implemented in many different forms of software, firmware, and hardware in the implementations illustrated in the figures. The actual software code or specialized control hardware used to implement aspects consistent with principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   storing, by a switching unit associated with a network device, a link aggregation group (LAG) media access control (MAC) address, the network device including a plurality of links, the LAG MAC address does not include any physical MAC addresses associated, respectively, with the plurality of links;
   monitoring, by a control unit associated with the network device and after storing the LAG MAC address, datagram traffic associated with the network device, the control unit being different from the switching unit;
   detecting, by the control unit and based on monitoring the datagram traffic, a pattern in the datagram traffic;
   assigning, by the control unit and based on detecting the datagram traffic pattern, the LAG MAC address to two or more links, of the plurality of links in the network device to create a LAG;
   receiving, at the switching unit and after assigning the LAG MAC address to the two or more links, datagrams, where the datagrams are associated with one of the two or more links; and
   simultaneously transmitting, by the switching unit, the received datagrams using the two or more links within the created LAG and the assigned LAG MAC address.

2. The method of claim 1, further comprising:
   routing the datagrams based on the assigned LAG MAC address.

3. The method of claim 1, further comprising:
   removing a link, of the two or more links, from the LAG without changing the LAG MAC address.

4. The method of claim 3, further comprising:
   routing, based on the assigned LAG MAC address and based on removal of the link from the LAG, the datagrams.

5. The method of claim 4, where routing the datagrams includes preventing the datagrams from being routed on the link removed from the LAG.

6. The method of claim 1, where two or more links in the LAG comprise ports of the network device.

7. The method of claim 1, further comprising:
   monitoring, after assigning the LAG MAC address to the two or more links, datagram traffic conditions associated with the network device;
   determining, based on the monitoring of the datagram traffic conditions associated with the LAG, to add another link, of the plurality of links, to the LAG, the other link being different from the two or more links;
   assigning, based on determining to add the other link to the LAG, the LAG MAC address to the other link; and
   routing, based on the LAG MAC address being assigned to the other link, additional datagrams.

8. A device comprising:
   a switching unit to:
     store a link aggregation group (LAG) media access control (MAC) address; and
   a processor to:
     determine, after storing the LAG MAC address and based on a detected pattern in transmission conditions associated with received datagram traffic, to create a LAG,
     identify two or more ports, of a plurality of ports, associated with the detected pattern, and
     assign, based on determining to create the LAG, the LAG MAC address to the two or more ports to define the LAG, the LAG MAC address differing from respective physical MAC addresses of the plurality of ports, the switching unit being further to:
- receive, after the LAG MAC address is assigned to the two or more ports, datagrams associated with one of the two or more ports, and
- transmit, simultaneously, the received datagrams using the two or more ports of the created LAG and the assigned LAG MAC address.

9. The device of claim 8, where the plurality of ports comprises a plurality of output ports to forward the datagrams from the device.

10. The device of claim 8, where the plurality of ports comprises a plurality of input ports to receive the datagrams from a source external to the device.

11. The device of claim 8, where the switching unit is further to:
- cause datagrams to be routed based on the assigned LAG MAC address.

12. The device of claim 8, where the processor is further to:
- monitor, after assigning the LAG MAC address to the two or more ports, datagram traffic conditions associated with the network device,
- determine, based on the monitoring of the datagram traffic conditions associated with the LAG, to add another port, of the plurality of ports, to the LAG, the other port being different from the two or more ports,
- acquire the LAG MAC address from the switching unit, and
- assign, based on determining to add the other port to the LAG, the LAG MAC address to the other port, and where the switching unit is further to:
- receive additional datagrams, and
- route, based on the LAG MAC address being assigned to the other port, the additional datagrams.

13. A non-transitory memory device for storing instructions comprising: one or more instructions, which when executed by a switching unit in a network device, cause the switching unit to store a link aggregation group (LAG) media access control (MAC) address;
- one or more instructions, which when executed by a controller in the network device, cause the controller to monitor, after the storing of the LAG MAC address, datagram traffic conditions associated with a connection between the network device and another device, where the datagram traffic conditions indicate a pattern associated with the connection, the controller being different from the switching unit, and the connection being associated with two or more links, of a plurality of links associated with the network device;
- one or more instructions, which when executed by the controller, cause the controller to determine, based on the pattern in the datagram traffic conditions, to create a LAG;
- one or more instructions, which when executed by the controller, cause the controller to assign, based on determining to create the LAG, the LAG MAC address to the two or more links to define the LAG, the LAG MAC address not including any physical MAC addresses associated with the plurality of links;
- one or more instructions, which when executed by the switching unit, cause the switching unit to receive, after assigning the LAG MAC address to the two or more links, datagrams associated with one of the two or more links; and
- one or more instructions, which when executed by the switching unit, cause the switching unit to transmit, simultaneously, the received datagrams using the two or more links of the created LAG and the assigned LAG MAC address.

14. The memory device of claim 13, where the instructions further comprise:
- one or more instructions to route the datagrams based on assigning the LAG MAC address to the two or more links.

15. The memory device of claim 13, where the instructions further comprise:
- one or more instructions to remove a link, of the two or more links, from the LAG without changing the LAG MAC address,
- one or more instructions to route, based on the assigned LAG MAC address and based on removal of the link from the LAG, the datagrams.

16. The memory device of claim 15, where the one or more instructions to route the datagrams include:
- one or more instructions to prevent the datagrams from being routed on the link removed from the LAG.

17. The memory device of claim 13, where the instructions further comprise:
- one or more instructions to monitor, after assigning the LAG MAC address to the two or more links, datagram traffic conditions associated with the network device;
- one or more instructions to determine, based on monitoring the datagram traffic conditions associated with the LAG, to add another link, of the plurality of links, to the LAG, the other link being different from the two or more links;
- one or more instructions to assign, based on determining to add the other link to the LAG, the LAG MAC address to the other link; and
- one or more instructions to route, based on the LAG MAC address being assigned to the other link, additional datagrams associated with the network device.

* * * * *